(No Model.)

E. L. MANSFIELD.
LATHE CHUCK.

No. 298,488. Patented May 13, 1884.

Witnesses
S. N. Piper
E. B. Pratt

Inventor.
Edwin Laselle Mansfield
by R. Eddy atty.

UNITED STATES PATENT OFFICE.

EDWIN LASELLE MANSFIELD, OF BOSTON, MASSACHUSETTS.

LATHE-CHUCK.

SPECIFICATION forming part of Letters Patent No. 298,488, dated May 13, 1884.

Application filed January 7, 1884. (No model.)

*To all whom it may concern:*

Be it known that I, EDWIN LASELLE MANSFIELD, of Boston, in the county of Suffolk, of the Commonwealth of Massachusetts, have invented a new and useful Improvement in Chucks for Lathes; and I do hereby declare the same to be described in the following specification, and represented in the accompanying drawings, of which—

Figure 1:
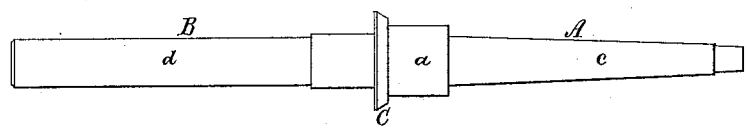
Figure 2:
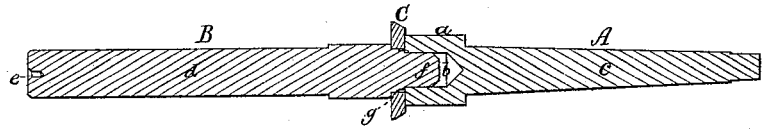
Figure 3:
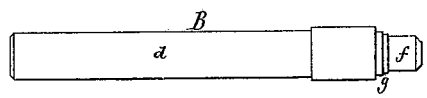
Figure 4:
Figure 5:
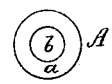

Figure 1 is a side view, and Fig. 2 a longitudinal section, of a nut or disk chuck of my invention, the nature of which is defined in the claims hereinafter presented. The said drawings exhibit a chuck as applied to a metallic washer, such chuck being for the purpose of supporting, holding, centering, and revolving the washer or article in a lathe while such article or washer may be in the act of being turned or polished or otherwise treated therein. Fig. 3 is a side view of the part B of the chuck, while Fig. 4 is an inner end view of it; and Fig. 5 is an inner end view of the part A, to be described.

The said chuck is in two principal parts, A and B, the part A being provided not only with a cylindrical or other proper-shaped head, *a*, having within it and opening out of it, at one end of it, a bore or cylindrical chamber, *b*, but with a conical or tapering shank, *c*, extended rearward from the said head, and concentric with the axis thereof produced. Such shank, when the chuck is in use, is to enter and fit the bore of the arbor of the head-stock of a turning-lathe. The part B has a cylindrical or other proper-shaped shank, *d*, having at the center of one end of it a centering-recess, *e*, and extending from the other a cylindrical tenon, *f*, such tenon having a diameter to fit the bore of chamber *b*. Between the tenon and the head there is or may be one or more short cylindrical extensions or steps, *g*, each being of a diameter a little greater than that of the tenon. These steps are designed to fit and centralize the eye of a washer or article, C, to be turned, provided such eye have a diameter longer than that of the tenon. On having the said article placed on the tenon, or on one of the steps when the part A is in a lathe-arbor, the tenon is to be inserted in a chamber, *b*, and the tail-stock of the lathe is to be moved up, so as to cause the centering-end of its spindle to enter the recess *e*, after which the said tail-stock is to be clamped to the lathe-bed, and the spindle should be forced forward by its screw, so as to firmly clamp the washer or article C to and between the two parts A and B. This having been done, the said parts and article will revolve with the head-stock arbor, when the latter may be put in revolution.

I claim—

1. The chuck, substantially as described, consisting not only of the part A, having the chambered head and tapering shank, but of the part B, having the conical centering-recess in the outer end of its shank, and the tenon extending from such shank at its other end, all being essentially and for the purpose as set forth.

2. The chuck consisting not only of the part A, provided with the chambered head and tapering shank, but of the part B, having the centering-recess in its outer end, and the tenon and one or more cylindrical steps at its other end, all being substantially and for use as explained.

EDWIN LASELLE MANSFIELD.

Witnesses:
R. H. EDDY,
E. B. PRATT.